E. W. RUSSELL.
Churn.
No. 69,843.
Patented Oct. 15, 1867.
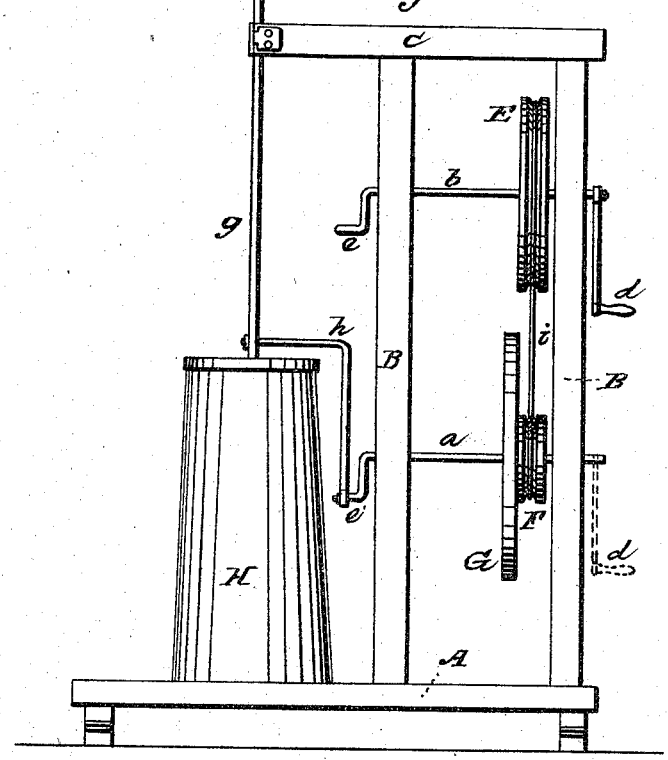
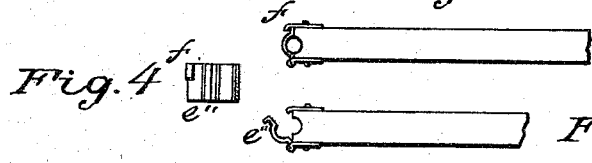
Witnesses:
P. T. Dodge.
Inventor:
E. W. Russell
By Dodge & Munn
his Attys

United States Patent Office.

ELI W. RUSSELL, OF ASHLEY, MISSOURI, ASSIGNOR TO SAMUEL S. RUSSELL, OF THE SAME PLACE.

*Letters Patent No. 69,843, dated October 15, 1867.*

IMPROVEMENT IN CHURNS.

*The Schedule referred to in these Letters Patent and making part of the same.*

TO ALL WHOM IT MAY CONCERN.

Be it known that I, ELI W. RUSSELL, of Ashley, in the county of Pike, and State of Missouri, have invented certain new and useful improvements in Mode of Operating Churns; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists of a new and improved method of operating the ordinary dasher-churn. In the drawings—

Figure 1 is a side elevation.

Figures 2, 3, and 4, views of a part detached.

In the construction of my invention I make a platform, A, and to this attach two or more uprights B, and over them frame a cross-piece, C, as shown in fig. 1. Through the uprights B, I pass two shafts, $a$ $b$, one above the other, and having their bearings in the uprights. The inner ends of the shafts are bent or made with a permanent crank, $e$, while their outer ends are made to receive a hand-crank, $d$. On the upper shaft $b$, I key a large pulley, E, and on the lower shaft $a$, and directly under the pulley E, I key a smaller pulley, F, and alongside of it, and on the same shaft $a$, a fly-wheel, G. The cross-piece C, I make sufficiently long to project far enough beyond the inner upright B to allow its extreme end to stand directly over the centre of an ordinary churn, H, when placed on the platform A, and so as to allow plenty of room between the churn H and the inner upright B. The projecting end of the cross-piece C, I mortise, and provide with a journal-box, I, of metal, or other suitable material, and having one side, $e$, hinged, and a clasp, $f$, for holding it, as shown in all the figures. Within this journal-box I, I place the handle $g$ of a common churn-dasher, and connect it by the pitman $h$ with the shaft $a$, as shown in fig. 1. The distance between the shafts $a$ and $b$ I regulate so that the pitman $h$ may be connected with either of them. The wheels E and F, I gear together with a belt, $i$, as shown in fig. 1.

With my apparatus thus constructed I am enabled to produce three separate degrees of speed or motion to adapt it to the varying quantities of cream or milk to be churned, the power required to operate it of course being varied in an inverse ratio. The churn being secured in any suitable manner upon the platform A, has its dasher secured by the clasp $e''$, and the pitman $h$ has one end attached to the dasher, its opposite end being attached to the crank on shaft $a$, the driving-crank $d$ being secured to the upper shaft $b$, as shown in the drawing, fig. 1. In this case it is obvious that the dasher will be operated with increased speed, as may be done when the quantity of cream is small. Now by changing the pitman $h$ to the crank $e$, as shown in red, the driving-crank $d$ remaining as before, attached to the shaft $b$, the motion of the dasher will be decreased, compared with what it was before, the result in this case being simply the conversion of rotary into reciprocating motion, with the benefit derived from the momentum of the fly-wheel G, the turning of the crank $d$, especially when assisted by the fly-wheel, being a much easier method of applying the power of the body than to take hold of the dasher direct, as is the case with the ordinary churn. If the quantity of cream to be churned is very great then the pitman $h$ may remain connected to the crank $e$ of shaft $b$, and the driving-crank $d$ be transferred to the shaft $a$, by which means the power will be increased with a corresponding decrease of speed in the dasher.

By having the horizontal arm of the pitman pass through a hole in the dasher, as represented in fig. 1, there will be imparted to the dasher a compound motion, that is to say, that at the same time that it has a vertically reciprocating movement, it will also have a reciprocating rotary motion, the dasher $g$ being turned partially around in one direction as the crank to which the pitman is attached rises to a horizontal position on one side, and is then turned as far in the opposite direction as the crank rises to a horizontal position on the opposite side. By attaching blades to the dasher, with their edges standing vertically, in addition to the usual horizontal blades, this motion may be utilized, and the cream be thereby agitated to much more than the usual degree, and thus the production of the butter be greatly expedited. If desired the cranks $e$ and $e'$ may also be made of different lengths, and thus a still further variation of the movements of the dasher be effected.

In this way I produce an apparatus that is exceedingly simple and cheap, and that is adapted to all the varying wants of families and dairies.

Having thus described my invention, what I claim, is—

The combination of the shaft $a$, having the pulley F, fly-wheel G, and crank $e'$ secured thereto, with the shaft $b$, having the pulley E and crank $e$, when arranged so as to have the pitman $h$ and crank $d$ applied to either at will, substantially as and for the purposes herein described.

ELI W. RUSSELL.

Witnesses:
S. S. RUSSELL,